United States Patent
Buck et al.

(10) Patent No.: US 6,917,981 B1
(45) Date of Patent: Jul. 12, 2005

(54) METHOD AND APPARATUS FOR SIGNALLING BETWEEN TERMINALS

(75) Inventors: Roger George Buck, Kesgrave (GB); John Robert King, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,316

(22) PCT Filed: Mar. 30, 1999

(86) PCT No.: PCT/GB99/00986

§ 371 (c)(1), (2), (4) Date: Aug. 31, 2000

(87) PCT Pub. No.: WO99/51056

PCT Pub. Date: Oct. 7, 1999

(30) Foreign Application Priority Data

Mar. 31, 1998 (GB) .............................. 9806945

(51) Int. Cl.[7] .............................................. G06F 15/16
(52) U.S. Cl. ........................ 709/230; 709/227; 709/228; 709/224; 370/410; 370/416; 370/467; 379/229
(58) Field of Search ........................ 709/230, 227–228, 709/224, 202, 204, 318; 370/410, 467, 416, 229; 379/229; 340/825.52

(56) References Cited

U.S. PATENT DOCUMENTS 4,782,517 A    11/1988   Bernardis et al.
6,028,924 A  *  2/2000   Ram et al. .................. 379/229

FOREIGN PATENT DOCUMENTS

WO      WO 97/48238       12/1997

OTHER PUBLICATIONS

Srinivas Chaganty et al, "Interfacing with Network Elements for Network Management and Control", Proceedings of the Pacific Rim Conference on Communications, Comput and Signal Processing, Victoria, CA, May 9–10, 1991, vol. 2, May 9, 1991, pp. 685–687.
Harris et al, "Intelligent Network Realization and Evolution: CCITT Capability Set 1 and Beyond", Proceedings of the International Switching symposium, Yokohama, Oct. 25–30, 1992, vol. 2, No. SMP. 14 pp. 127–131
Yechiam Yemini: "The OSI Network Management Model", IEEE Communications Magazine, vol. 31, No. 5, May 1, 1993, pp. 20–29, XP000367615.

* cited by examiner

Primary Examiner—Jack Harvey
Assistant Examiner—Hieu Le
(74) Attorney, Agent, or Firm—Nixon & Vanderhye P.C.

(57) ABSTRACT

A method of communications employs a communications protocols defining respective responses to predetermined events. The protocol is separated into a first group of behaviours defining responses to corresponding first, relatively frequently occurring, events, and a second group of behaviours defining responses to corresponding first, relatively frequently occurring, events, and a second group of behaviours defining responses to corresponding second, relatively infrequently occurring events. The first group is stored at a user communications terminal. At least the second group is stored at a store remote from the user terminal, and interconnected therewith via a communications channel. Communication is established from the user terminal using first events. On detecting an event other than one of said the first events at the user terminal, event holding data is signaled from the store to the user terminal; and communication is established from the user terminal using the event-handling data.

18 Claims, 7 Drawing Sheets

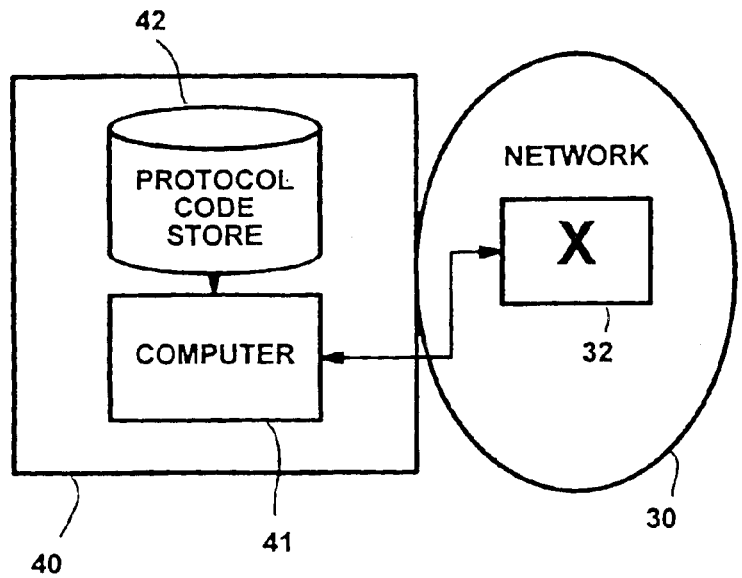

FIG. 3

Exception_Request                     200

| Parameter | Parameter Description |
|---|---|
| 202 Current State | Q2931 state currently in |
| 204 Exception Trigger | Choice of Input/Time-out/Parameter. This will distinguish what has caused the exception |
| 206 Exception Input | Required for Input trigger and probably Parameter trigger |
| 208 Exception Time-out | Name of expired timer |
| 210 Exception Parameter List | List of unidentified parameters |

(a)

Exception_Response                    250

| Parameter | Parameter Description |
|---|---|
| 212 Task List | List of tasks that the access signalling process must perform e.g. parameter value assignment, decisions |
| 214 Output | Any output message that needs to be sent |
| 216 Next State | Q2931 state after tasks and output |

Exception_Response 201

| Parameter | Parameter Description |
|-----------|----------------------|
| Code | Executable code for action(s) that the access signalling process must perform |

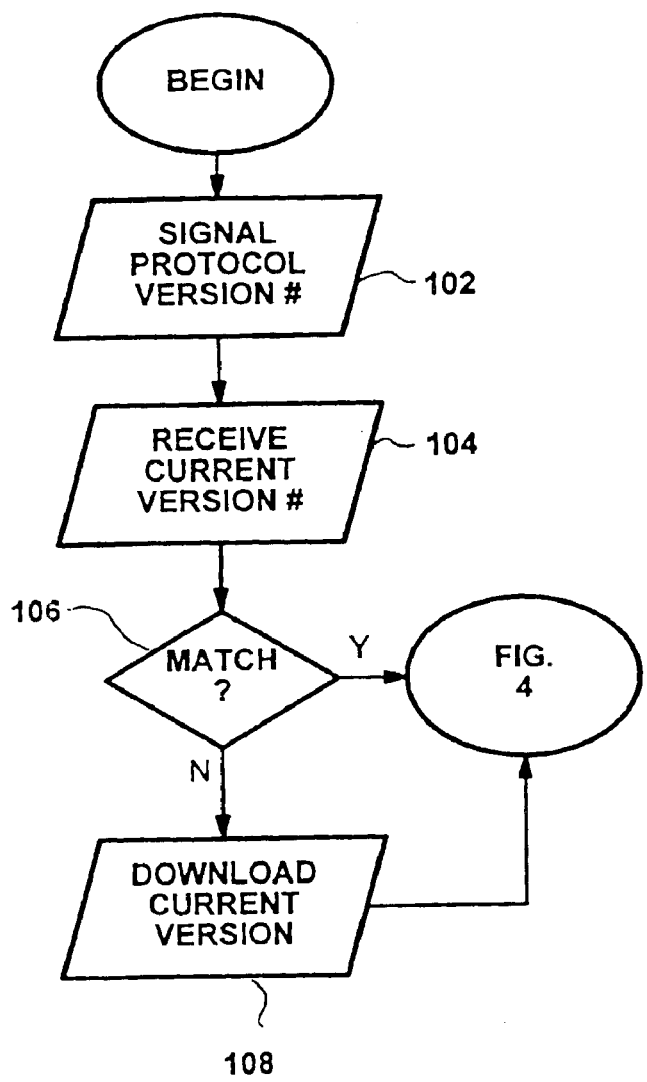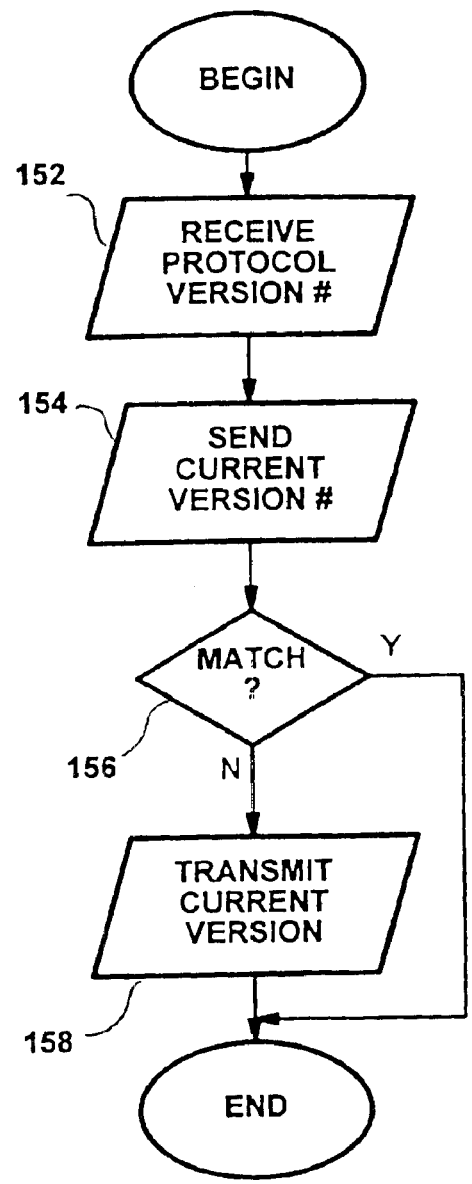
*FIG. 10a*  *FIG. 10b*

METHOD AND APPARATUS FOR SIGNALLING BETWEEN TERMINALS

BACKGROUND OF THE INVENTION

1. Field of the Invention

This invention relates to methods and apparatus for signalling between a first terminal and a second, via a network employing a signalling protocol.

2. Related Art

One such access signalling protocol is defined in ITU Q2931, entitled "Broadband Integrated Services Digital Network (B-ISDN)—Digital Subscriber Signalling System No 2 (DSS 2)—User-Network Interface (UNI) Layer 3 Specification for Basic Call/Connection Control", well known, and available from the International Telecommunications Union, of Geneva, Switzerland.

This protocol defines the signalling procedures to be followed by a first terminal in accessing a second to set up and operate an ISDN communications session.

Many conditions may exist or occur during such a communications session. For example, the remote terminal may be busy, or unable to signal at a certain rate, or unobtainable (damaged or switched off). Alternatively, the network may be congested, or a busy tone may be generated from the local exchange. Data may be lost, or delayed, or corrupted in passage.

Many such protocols, such as Q2931, define a state machine; that is to say, a machine that can exist only in one of a number of predefined states, and can move from state to state in response to the occurrence of a predetermined event or combination of events. Actions are performed in moving the terminal from one state to another.

Such events may be, for example, the receipt of a defined signal from the second terminal via the network, or the elapsing of a predetermined time in the state. The actions taken in response may involve external signalling, or resetting an internal timer, and moving to a new state. The protocol defines the set of states, and the set of actions, and the events triggering the performance of the actions and changes of state.

A simple call set-up sequence starts with a first terminal moving from the on-hook state to a first active state in response to user action, dialling a second terminal, and then entering a wait state awaiting the next event. The two terminals pass through a succession of such states during handshaking signalling, until the call is set up.

If unusual conditions in the network or at either terminal occur, however, it is necessary to use appropriate exception-handling behaviour, or else one or both terminals may "hang", awaiting a "normal" event which will never occur. Such conditions will be interpreted as events, corresponding either to receipt of a "signal" (which may be noise) or elapsing of a time period within which the normal signal should have been received.

The total number of such unusual conditions is large, and each may require different handling depending on the state the terminal is in at the time. This leads to a large number of responses in a set such as Q2931. Encoding such protocols as an operating control program for a terminal may require, for Q2931, 200 kilobytes to 1 Megabyte of executable code.

It might be supposed that the widespread availability of cheap memory and disk drive components would readily accommodate a program of such a size.

BRIEF SUMMARY OF THE INVENTION

The present inventors have realised, however, that new types of computing devices such as Network Computers (NCs), Personal Digital Assistants (PDAs), and Java-enabled mobile phones will find it difficult to store large communications programs since they generally, for reasons of size and cost, lack a magnetic media drive such as a hard disc drive, and have small PROM, EPROM or flash memory devices.

Further, the present inventors have realised that within a given communications protocol such as Q2931, a very large proportion of the actions (more than half) are for handling exceptional events, and only a relatively small core of actions are routinely used.

Accordingly, the present invention provides a system in which a terminal only stores code to execute this core behaviour. The remainder of the responses, for handling unusual events, are stored elsewhere at a store in the network (for example at a Network Server computer forming a node of the network). On encountering an exceptional event, the terminal receives data from the store to enable it to handle the event.

The terminal may signal to the store to request such data on encountering an exceptional event. The signal may indicate the event, and the state of the terminal on encountering it.

In one embodiment, the data comprises code which the terminal can store and execute as an additional action, for use in future communications sessions. Thus, the core of actions stored at the terminal can be augmented by the addition of those extra actions needed to deal with only those exceptional events which have occurred in the past (and may be likely to recur). The storage may be long-term, or the terminal may discard little-used stored extra actions.

In another embodiment, the data comprises instructions executed by the terminal to handle the exceptional event, but not stored for future use. Thus, local storage requirements are minimised.

The store and/or the terminals may initially determine whether the stored core behaviour is current, and if not, current actions may be downloaded from the store to the terminals for future use. At this point, it may be mentioned that WO 97/048238 discloses a network switch (not a terminal) which operates conventional communications protocols, and is controlled from a separate service control unit for enhanced service calls.

Other aspects, embodiments and preferred features of the invention will be apparent from the following description and claims, together with the advantages thereof.

BRIEF DESCRIPTION OF THE DRAWINGS

Embodiments of the invention will now be described, by way of example only, with reference to the accompanying drawings in which:

FIG. 3 is a block diagram showing schematically the elements of a network server forming part of FIG. 1;

FIGS. 6a and 6b are schematic diagrams illustrating the structure of messages exchanged in the first embodiment;

FIG. 10a is a flow diagram illustrating an initial process formed prior to that of FIG. 4 at the terminal in a fourth embodiment of the invention; and FIG. 10b is a flow diagram showing schematically the corresponding process performed in response at the network server in the fourth embodiment.

DETAILED DESCRIPTION OF EXEMPLARY EMBODIMENTS

First Embodiment

Figure 1:
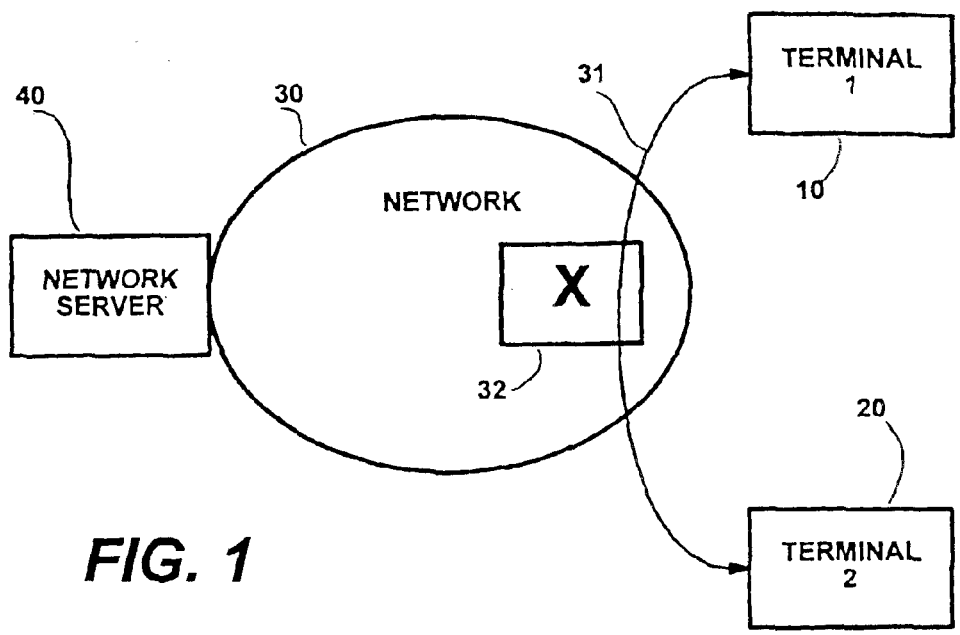
FIG. 1 is a block diagram showing schematically the elements of a communications network embodying a first embodiment of the present invention.

Referring to FIG. 1, the present embodiment comprises a first terminal 10, a second terminal 20, and a telecommunications network 30 including a network node 40.

The term "terminal" herein indicates that the terminals are external to the network (i.e. are at network terminations) rather than implying any particular structural or functional limitations.

Figure 2:
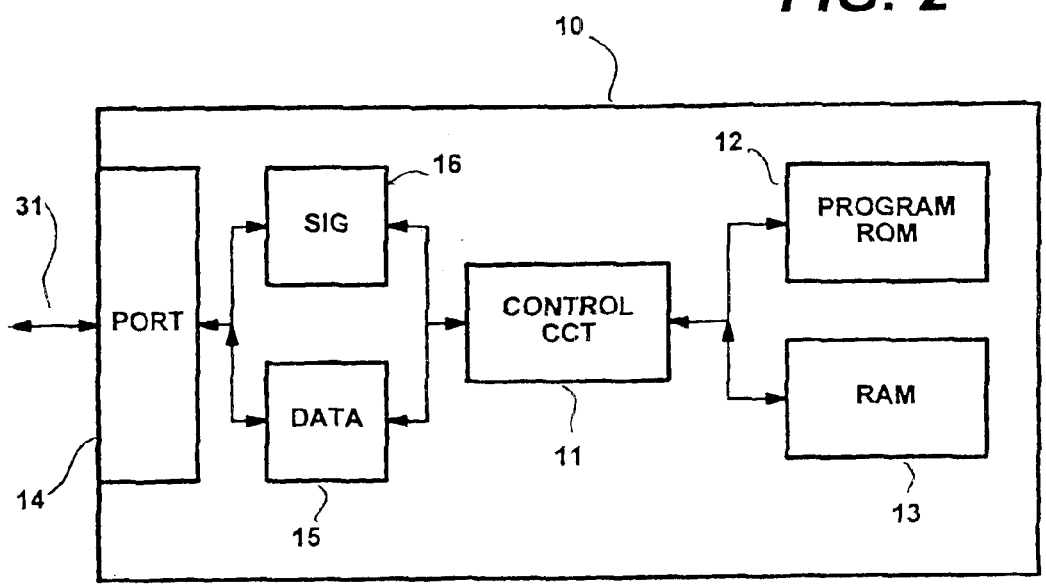
FIG. 2 is a block diagram showing schematically the elements of a terminal forming part of FIG. 1.

The first terminal 10 comprises a Network Computer. Referring to FIG. 2, it consists of a control circuit 11 (e.g. a microprocessor or microcomputer such as a Pentium 2 processor available from Intel, or a StrongARM reduced instruction set computer (RISC) available from Acorn Ltd).

Coupled to the control circuit 11 (e.g. via buses) are an instruction store 12 (comprising, for example, a ROM or an EPROM or a Flash programmable memory) holding the operating system, applications programs and communications programs for the terminal 10, and a read/write working memory 13 (e.g. a RAM) for retaining data and transitory programs.

The operating system may comprise Windows 95™ or Windows CE™ and is arranged to accept a downloaded executable program subroutine, store it in the working memory 13, and execute it.

Further provided is a communications port 14, comprising a physical connector for connection to an ISDN line 31 connected to the network 30, and a pair of logical ports 15, 16, one (15) for connection to a data channel (e.g. an ISDN B channel) and one for connection to a signalling channel (e.g. an ISDN D channel). Other elements provided may comprise user output devices such as a loudspeaker, and user input devices such as a keyboard, cursor control device (e.g. mouse) or microphone. Where the device is intended as a set-top box, for co-operation with an existing television set, it further comprises a video output port, which may be a SCART connector port, or an RF-modulated aerial cable connector socket.

Held within the instruction store 12 is executable code for causing the control circuit 11 to perform a subset of the actions of the User Access Side of the Q2931 protocol, by sensing incoming signals on the data and signalling ports 15, 16 and generating and supplying outgoing signals to those ports.

The second terminal 20 may be identical to the first for carrying out a bi-directional communications session with the first (e.g. a digital videotelephony session), or may comprise for example a computer carrying files of data to be downloaded by the first (using, for example, File Transfer Protocol (FTP)).

The telecommunications network 30 is an ISDN network in this embodiment, comprising a plurality of Asynchronous Transfer Mode (ATM) switching nodes 32 interconnected by high-bandwidth links (e.g. fibre optic cables) carrying data in ATM cells (i.e. packets).

Referring to FIG. 3, the network node 40 comprises a computer 41 and a store 42 storing data corresponding to at least the remainder of the entire set of executable code for the Q2931 signalling protocol (i.e., at least the portions of the set not already stored as a subset in the first terminal 10). At the same (or a different) network node 40 is a computer (e.g. computer 41) arranged to implement the Network Access Side (NAS) actions of the Q2931 set.

Similarly, the second terminal 20 executes the User Access Side (UAS) actions for Q2931. Thus, on setting up a new session from the first terminal to the second, the terminal 10 and computer 41 are able to carry out a signalling dialogue, to enable the computer 41 to set up a connection from the first to the second.

The actions stored in the form of executable code within the store 13 comprise:

Section 5.1—Normal Call Behaviour except:
5.1.1 Where Time-out conditions occur
5.1.2.1 Where VCI is not available
5.1.2.3 Where VPCI or VCI not available
5.1.4 Where requested QoS not available
5.1.4
5.1.5 Where requested service is not authorised or not available or Time-out conditions occur
5.1.8

Section 5.2—Normal Cell Behaviour except:
5.2.1 Where Time-out conditions occur
5.2.2.2.2 Where no compatible user equipment exists
5.2.3 Where value supported by network
5.2.3.4 Where no VCI available
5.2.3.5 Where specified VPCI or VCI is not available
5.2.6 Where requested QoS cannot be provided
5.2.5.7 Where user is incompatible
5.2.5.4
5.2.7 When Time-out condition occurs Section 5.4—Normal Call Behaviour except:
5.4.2
5.4.3 Where Time-out condition occurs
5.4.4 Where time-out condition occurs
5.4.5

In the foregoing, it will be understood that "VCI" indicates an ATM Virtual Channel Indicator; "VPCI" indicates an ATM Virtual Path Connection Indicator, and QoS indicates Quality of Service.

The progress of a typical call will now be described with reference to FIG. 4. In a step 110, the control circuit 11 performs call set up signalling. The signals are recognised by the network server 40, which creates a connection to the second terminal 20. If, in a step 112, an exceptional event is detected (for example, a Time out, or an "error" or "busy" signal) due, for example, to network damage or congestion, the processor 11 signals to the network server 40 in step 124 as will be described in greater detail below.

When the call set up is completed (step 114), the call session takes place (step 116). After completion of the call session, call clear down signalling is commenced to close down the call (step 118). If, during the call cleardown signalling, an unknown event is encountered (step 120) the terminal 10 signals to the network server 40 in step 124 as will be described in greater detail below.

Thus, if no unusual or unexpected events occur, call set up, progress and clear down is exactly like a normal ISDN call session.

Figures 5A, 5B:
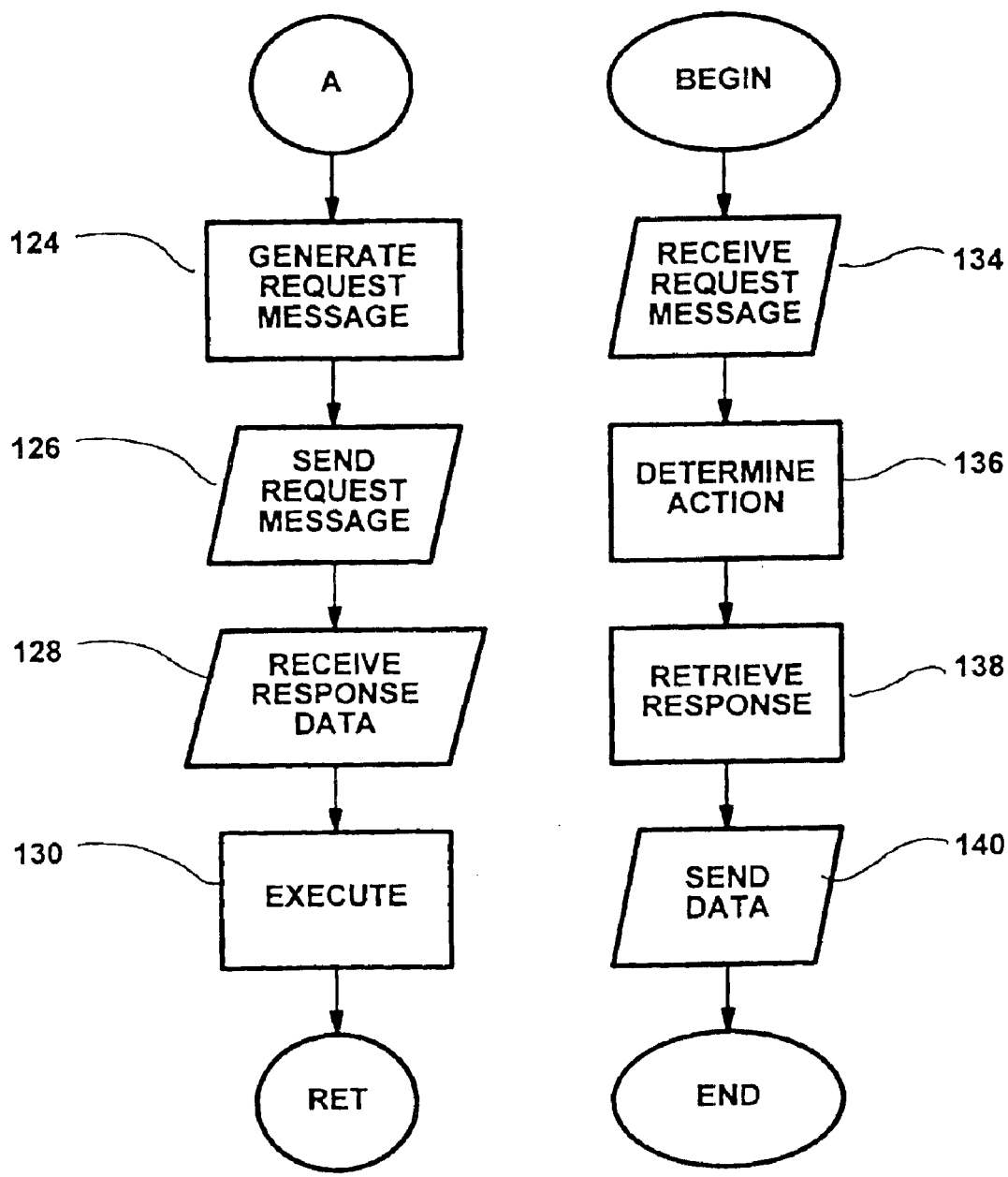
FIG. 5a is a flow diagram showing schematically the process of operation of the terminal of FIG. 2 following the process of FIG. 4 on encountering an unknown event.
FIG. 5b is a flow diagram showing schematically the flow of operation of the network server of FIG. 3 in response to the performance of FIG. 5a by the terminal.

Referring now to FIG. 5a, where an unexpected event occurs, in step 124 the control circuit 11 generates a request message and transmits the request message in step 126 to the network server via the signalling port 16.

Referring now to FIG. 6a, the request message 200 includes a field 202 indicating the current state of the terminal 10; field 204 indicating whether the event was a time-out, a received message or signal or a parameter (i.e. a field within a signal or message); and respective fields 206, 208, and 210 indicating, respectively, the identity of the input signal, the time-out, or the parameter(s) which caused the unknown event.

Referring now to FIG. 5b, the network server 40 receives the request signal in a step 134, and analyses the state of the terminal 10 and the identity of the unknown event, to determine what the event was, using the protocol code store 42, in a step 136. Next, in step 138, the network server 40 retrieves from the protocol code store 42 data indicating what the correct response according to Q2931 should have been, and in step 140, the network server creates and sends an exception response message 250.

Referring now to FIG. 6b, the response message 250 comprises a task list field 252 listing the tasks that the access signalling process must perform next; an output field 254 containing any output message that needs to be sent in response to the unknown event; and a next state field 256 indicating the next state according to the Q2931 protocol after performance of the tasks and outputting of the output message. These collectively form the action taken in response to the event according to the protocol.

The terminal 10 receives the response message 250 in a step 128 of FIG. 5a, and in step 130 the control circuit 11 executes the contents of the response message, by performing the listed tasks in field 252, outputting any message in the field 254 via the signalling port 16, and then entering the next state identified in the field 256.

In this embodiment, therefore, the control program stored within the program store 12 includes routines for interpreting the tasks downloaded within the task list field, and causing the control unit 11 to execute these, and for causing the control unit to put the terminal into one of the predetermined states of the Q2931 protocol, and for causing the control unit to output the contents of the output signal field downloaded from the network at the signalling port 16, effectively parsing and executing the downloaded instructions from the network server 40 in real time as if they were a stored protocol for dealing with the unknown event.

Thus, in this embodiment, there is no need for the terminal 10 to store additional information above the code defining the "core" behaviour within the code store 13, which may therefore be kept compact.

Second Embodiment

Although the exceptional events for which the terminal 10 does not store response actions are typically relatively rarely occurring in the first embodiment, nonetheless some types of such event may, if they occur once, recur later (for example because of some recurrent or persistent network congestion or damage).

Accordingly, in this embodiment, the response message from the network 31 includes data which is stored at the terminal 10 to enable the terminal 10 to recognise and handle the event concerned in future without returning to the network server 40. This embodiment may therefore improve the response speed of the terminal 10 in future, and may lead to lower signalling volumes over the network 30 if the exceptional event recurs frequently. In more general terms, the core actions stored on the terminal 10 are updated and adapted to reflect the fact that conditions initially thought to be exceptional may in fact become routinely or frequently encountered.

Figure 7:
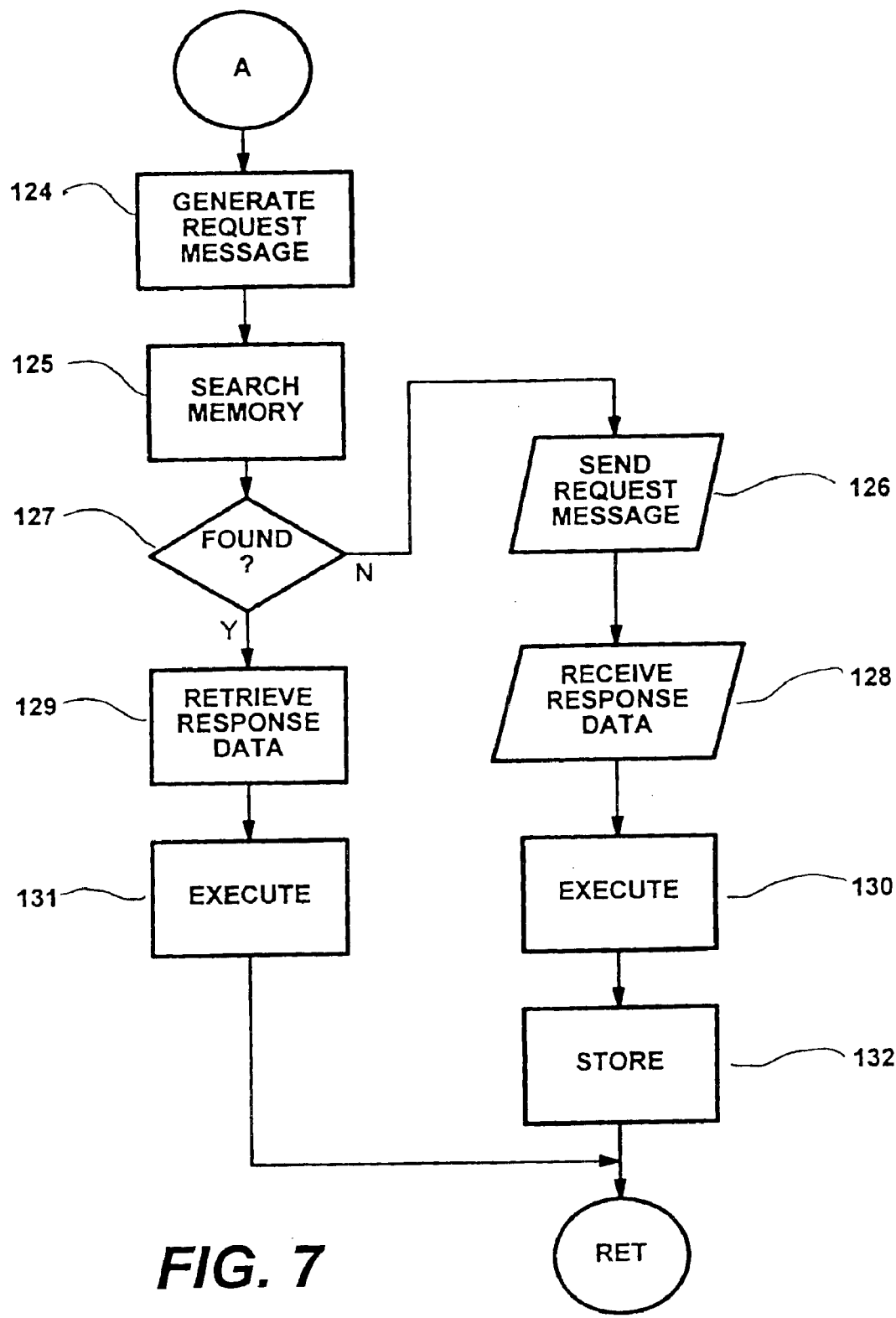
FIG. 7 is a flow diagram replacing that of FIG. 5a in a second embodiment of the invention.

In this embodiment, the hardware components are the same as in the first and will be referred to by the same reference numerals. However, as shown in FIG. 7, the process of FIG. 5a is modified to include an additional step 132 of storing the response data within the read/write memory 13, as a supplement to the stored control program.

After the request message is generated in step 124, in step 125 it is used to search the memory 13 for earlier stored messages having the same current terminal state and unknown event. If (step 127) no such stored data is located (indicating that the unknown event has not previously been encountered) processing continues at step 126 as described in the first embodiment. If, on the other hand, it is determined that the memory 13 includes stored data indicating that the same unknown event was encountered in the same terminal state previously, then the response data stored together with that request message data (in a previous execution of step 132) are retrieved in step 129, and executed in step 131, in the same manner as the execution in step 130 described above in the first embodiment.

The downloaded event handling data described in the first embodiment could simply be stored in step 132, together with the contents of the request message to which it was a response.

In this case, on future occurrences of an unknown event, the processor 11 is arranged to search the read/write memory 13 for a stored request message having an unknown event and current terminal state matching those currently encountered, and to retrieve and parse the corresponding response message which was stored together therewith.

In this case, the second embodiment functions exactly like the first embodiment but with interrogation of the memory 13 serving in place of signalling to the network server 40 where the unknown event has been encountered previously.

Third Embodiment

Figures 8, 9:
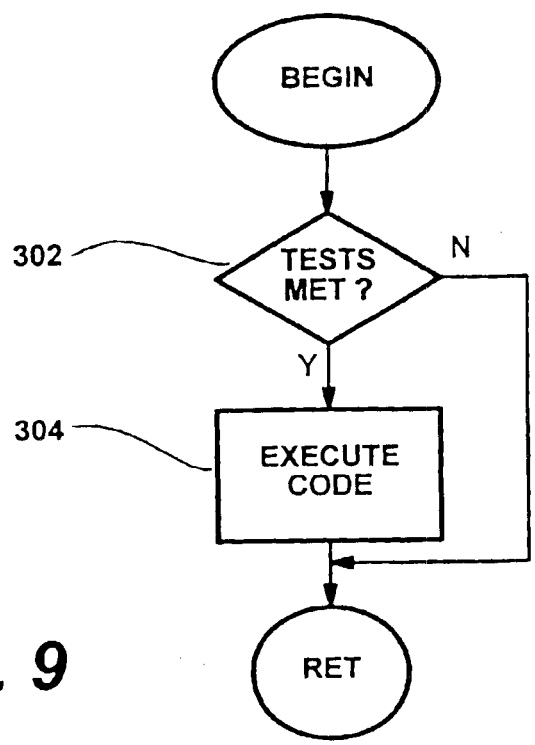
FIG. 8 is a diagram illustrating the structure of a message replacing that of FIG. 5b in a third embodiment of an invention.
FIG. 9 is a flow diagram illustrating the operation of the terminal in performing a downloaded subroutine according to the third embodiment.

Whereas, in the second embodiment, the event handling data is stored in the form of instructions to be parsed and executed by a high-level interpreter program at the terminal 10, in this embodiment, low-level executable code for implementing the action for handling the unknown event is downloaded from the network server 40, the response message 200 of FIG. 6b being replaced by that 201 of FIG. 8 comprising serialised code for execution.

The code may be in the form of an intermediate programming language representation, such as Java™ code or Pascal P-code, which can be executed by a "virtual machine" interpreter or compiler forming part of the control program stored in the control program store 12.

Alternatively, the code may be low-level machine code specific to the architecture of the control circuit processor 11, in which case the request message of FIG. 6a is modified to include a field indicating the processor type of the control circuit 11, and the network server 40 is arranged either to store multiple encoded programs for executing the protocol, in the machine languages of different common processors (e.g. Intel processors, Motorola processors, Acorn processors and the like), or to store multiple compilers for generating code for each such processor from a single stored high-level representation of the protocol.

On receiving the response message of FIG. 8, the control circuit 11 stores the code in the memory 13. The control program for executing the actions is therefore distributed between the original "core" action modules stored in the store 12, and the downloaded modules stored in the memory 13. Referring to FIG. 9, the stored module consists generally of a logical test (step 302) of the processor state and the unknown event followed, if they match, by execution (step 304) of the remaining downloaded code to handle the action, and if not, by a RETURN statement.

Thus, in this embodiment, no additional parsing program is required within the terminal 10 for executing the downloaded event handling data, which may be advantageous where only small numbers of exceptional events are expected to occur.

Preferably, in this embodiment, to prevent over-accumulation of very rarely used actions within the memory 13, the control circuit 11 is arranged to count the number of communications sessions initiated since downloading each action module and the number of occasions on which that module has been executed, and to erase from the memory 13 any module which is not executed within a predetermined number of communications sessions (for example, 100 sessions).

Thus, events which are genuinely rare do not, over the long term, cause the reduction in storage capacity in the terminal 10. Other measures of the frequency of use of the downloaded modules could, of course, be substituted for that just described.

Fourth Embodiment

In this embodiment, the apparatus is as described in the preceding embodiments and the same reference numerals will be employed.

Figure 4:
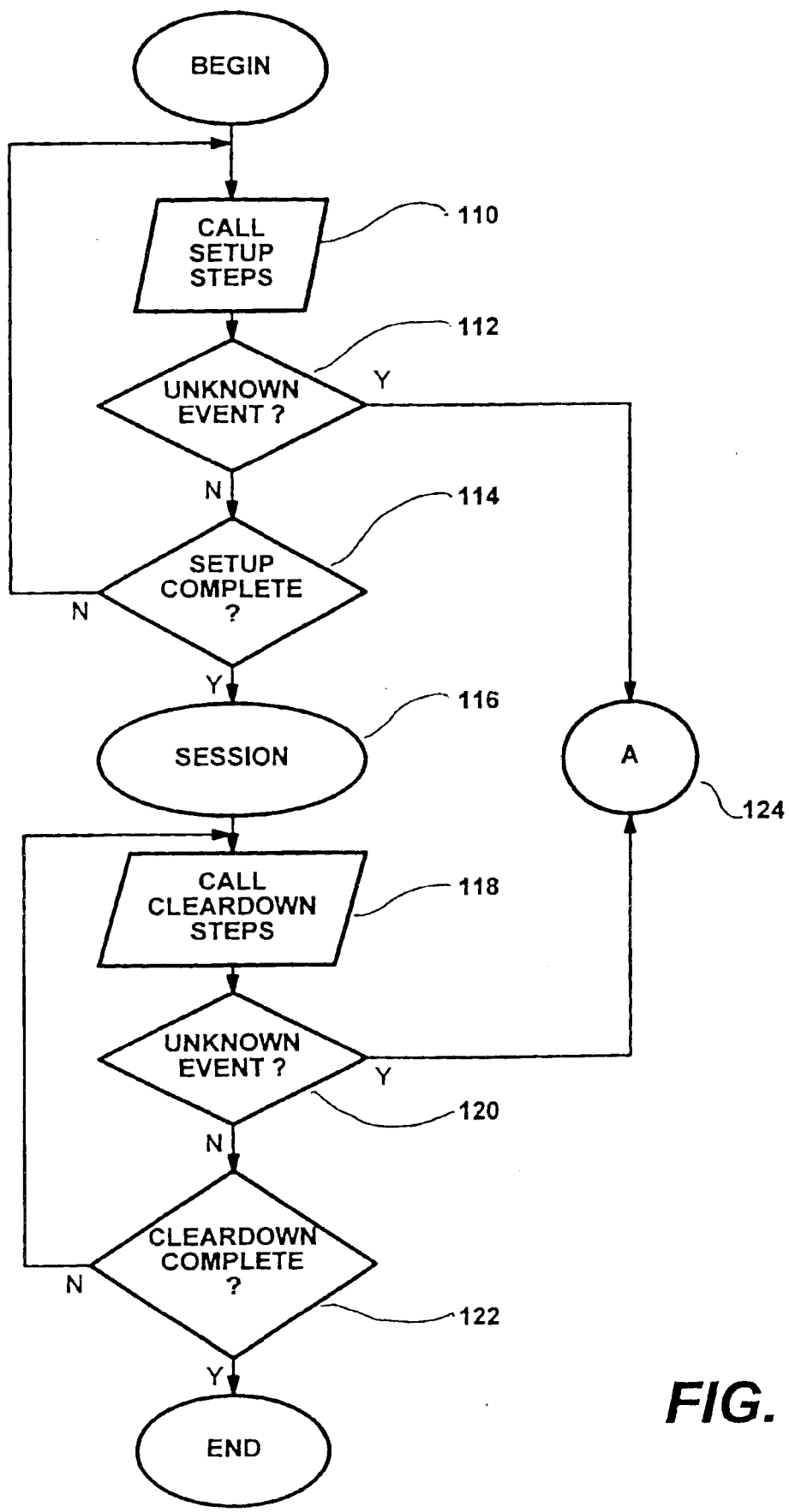
FIG. 4 is a flow diagram showing schematically the overall flow of operations of the terminal of FIG. 2 during a call.

In this embodiment, the operation of the terminal 10 described in relation to FIG. 4 is modified as shown in FIG. 10a, and the network server 40 performs the additional process of FIG. 10b.

In this embodiment, it is noted that the core signalling behaviour may change over time. This may arise firstly because the Q2931 protocol is varied or added to, or it may arise because events which were initially infrequent become part of the core signalling behaviour, and vice versa.

Accordingly, in this embodiment, the core actions stored within the instructions store 12 carry a version number. Over time, the core behaviour may change and on each such change, the version number is incremented. The program store 12 in this embodiment is electrically reprogrammable by the terminal 10.

On each attempt to set up a call by or to the terminal 10, the terminal 10 signals to the network server 40 a message which includes the version number of the core actions it currently stores, in step 102 of FIG. 10a. In step 152 of FIG. 10b, this message is received at the network server 40 and in step 154, the network server 40 transmits back a message indicating the current version number of the core actions (i.e. the version number stored in relation to the core actions stored at the network server 40 itself).

In step 104 of FIG. 10a this is received by the terminal 10 and in a step 106 the control circuit 11 compares the two version numbers. If they match, control circuit 11 resumes with the process of FIG. 4 described above to execute any one of the first, second or third embodiments as already described. The same test is performed in step 156 at the network server 40.

If the version numbers do not match, then the terminal 10 and network server 40 communicate in steps 108 and 158 to transmit a current version of the actions, as executable code, from the network server 40 to be stored in the memory 12 for future use by the terminal 10. The process of FIG. 4 in relation to the first, second or third embodiments described above is then performed using the newly downloaded set of core actions.

Thus, the core action set stored on each of the terminals is updated to be current prior to each communications session.

Rather than downloading an entire replacement executable core program, it would be possible to download a list of those action subroutines or modules which have changed, together with the replacement code for those modules, enabling the control circuit 11 to amend the existing control program by deletion and replacement of parts of the program, rather than completely replacing it. Alternatively, a self-executing program for performing the same operation could be downloaded from the network server 40.

One or both (or, for a multi-terminal session such as an audio or video conference, all) of the terminals may embody this aspect of the invention and accordingly such protocol updating may be performed on some or all of the terminals.

Other Embodiments and Variations

It will be clear to the skilled reader that the foregoing embodiments are merely by way of example and that many other alternatives and modifications are possible within the spirit of the invention. Accordingly, the present application is not limiting to the above disclosed embodiments but encompasses any such variations or modifications, and any or all novel subject matter contained herein.

For example, rather than storing the actions as executable code at the terminals, it is possible to store them, and, by the same token, to download them, in the form of high-level representations such as sequence description language (SDL) code, provided a suitable interpreter program is resident on the terminal.

Although the invention has been described in the context of a terminal comprising a set-top box for communication with a television set via a video output port, it will be clear that it is applicable to other devices with limited memory or storage (for example having no hard drive or tape drive) such as personal digital assistants (PDAs), notepad and handheld computers, mobile phones, and the like. It is also applicable, of course, to devices without limited memory and storage capacity, such as main frame computers, workstations or servers where it is desired to achieve the benefits of a readily upgradable protocol.

Although the invention has been described in relation to the Q2931 ISDN access protocols, it will immediately be apparent that it is equally applicable to the access signalling protocols of any other communications standard such as the GSM mobile communications protocol or its equivalents in other countries, and to communications protocols other than for access and cleardown signalling.

Although in the foregoing the terminal 10 signals to the network server 40 to indicate the unknown event and terminal state, it is possible that in some networks or under some conditions, the network server may itself be able to infer these from records of the signalling which has taken place held within the network itself and may therefore be able to supply the event handling data without requiring an initiating signal from the terminal 10.

Similarly, the network server 40 may be able to infer that certain events for which there is no responsive action within the core behaviour (e.g. the likelihood of certain types of busy state) may occur based on knowledge of current network traffic conditions, or (e.g. that the terminal makes use of rare signalling procedures) from knowledge about the other terminal involved, or the nature of the session being set up Accordingly, request signalling from the terminal 10 is not essential to the operation of the invention.

Although updating only the core behaviour is described in the above embodiments, it would equally be possible to implement the entire signalling protocol where the storage available to each terminal is large enough, and to perform the process described in relation to the fourth embodiment to update the entire protocol. Accordingly, the feature of storage of only a limited subset of the protocol is not essential to the above described fourth embodiment, and protection is or may separately be sought for the fourth embodiment independently of such a feature.

What is claimed is:

1. A method of communications employing a predetermined communications protocol defining respective responses to predetermined events, said method comprising:

separating said protocol into a first group of responses to corresponding first events, and a second group of responses to corresponding second events, wherein said first events occur frequently relative to said second events;

storing, at a communications user terminal which is external to but connected to a communications network via a communications channel, said first group of responses;

storing, at a store in or connected to the communications network, at least said second group of responses;

communicating from said user terminal using said first group of responses;

on detecting an event other than one of said first events at said user terminal, sending event-handling data from said store to said user terminal; and communicating from said user terminal using said event-handling data.

2. A method as in claim 1, in which, when the detected event is one of the second events, said event-handling data comprises at least the responses of said second group which correspond thereto.

3. A method as in claim 2, in which the user terminal is arranged to store those responses of said second group received from the store on receipt thereof, for future use in response to further occurrence of the corresponding event.

4. A method as in claim 3, in which the user terminal is arranged to delete said stored responses under predetermined conditions.

5. A method as in claim 4, in which the predetermined conditions comprise non-use of the stored responses for a predetermined period of use.

6. A method as in claim 1, in which said event-handling data comprises data defining instructions for handling the detected event.

7. A method as in claim 1, wherein the protocol is for use of an ISDN communications channel.

8. A communications system comprising:

a telecommunications network;

a first terminal external to but connected to said network;

a second terminal interconnectable with the first terminal via said telecommunications network, and a store in or connected to said network;

in which:

the second terminal is arranged to communicate using a communications protocol defining a set of responses to respective conditions;

the first terminal stores, and is arranged to communicate using, a subset of said protocol; and the store is arranged to cooperate with the first terminal for handling conditions requiring a response within the set but not within the subset earlier stored at the first terminal.

9. A communications terminal for use with a communications protocol defining a set of responses to respective predetermined events, said terminal comprising:

a communications port for connection to a telecommunications network via a communications channel, the communications terminal being external to the telecommunications network;

a signaling port for connection to said telecommunications network via a signaling channel; and a store for storing data defining a core subset of said responses corresponding to a core subset of said events; and a controller for controlling communications via the communications and signaling ports in accordance with said core subset of said responses;

the terminal being arranged to detect events not within said core subset, and to receive event-handling data via said signaling port, and the controller being arranged to handle said detected events in accordance with said received event-handling data.

10. A terminal as in claim 9, in which said store is rewritable, and the terminal is arranged to store therein data derived from said event-handling data, and corresponding to one or more responses of said set which are not of said core subset, and the controller is for controlling communications via the communications and signaling ports in accordance with said core subset and said stored additional responses.

11. A terminal as in claim 10, the terminal being arranged to erase said additional responses under predetermined conditions.

12. A terminal as in claim 9, in which said controller is arranged to accept said event-handling data as one or more communications signaling instructions for immediate execution.

13. A terminal as in claim 9, the terminal being arranged to signal said detected events via said signaling port and to receive said event-handling data in response thereto.

14. A terminal as in claim 13, the terminal being arranged to signal, for each said detected event, the internal state of the terminal prior to receipt thereof via said signaling port.

15. A terminal as in claim 9, wherein said store does not comprise a movable magnetic storage medium.

16. A terminal as in claim 15, which lacks a movable magnetic storage medium.

17. A terminal as in claim 9, which comprises a network client terminal.

18. A terminal as in claim 17, which comprises a video output port for co-operation with a television set.

* * * * *